March 7, 1950 R. PACH 2,499,524

NOZZLE FOR CUTTING TORCHES

Filed Dec. 27, 1945

INVENTOR.
ROY PACH
BY
Williamson & Williamson
ATTORNEYS

Patented Mar. 7, 1950

2,499,524

UNITED STATES PATENT OFFICE 2,499,524

NOZZLE FOR CUTTING TORCHES

Roy Pach, Minneapolis, Minn.

Application December 27, 1945, Serial No. 637,355

4 Claims. (Cl. 158—27.4)

This invention relates to oxyacetylene torches for cutting and gouging metal and the like and particularly to an improved nozzle structure, the principle and structure of which are adapted to numerous types of cutting torches.

It is an object of my invention to provide a simple, highly efficient nozzle for oxyacetylene cutting torches and the like which will provide for additional and more efficient mixing of the preheating gases utilized; which will effect a faster and more accurate cutting of metal and which will not backfire even when utilized on rusty iron or dirty metals.

Another object is the provision of a cutting nozzle of the class described wherein the preheating flame produced is in substantially cylindrical or annular form as distinguished from the multi-orifice flame utilized in most conventional cutting nozzles, thereby applying the heat more directly and accurately to the line of cut and eliminating the undesirable spreading of flame in from four to six directions when the oxygen cutting stream is introduced.

Another object is the provision of an improved cutting nozzle which operates with little heating to itself thereby materially increasing the lasting qualities and durability.

Oxyacetylene torches for both cutting and gouging are of two general types. In one type the acetylene gas for preheating is mixed within the torch itself with the requisite amount of oxygen to support combustion. In the other general type the torch proper includes passages or tubes with valve controls for supplying both acetylene and combustion supporting oxygen to the nozzle for preheating flame as well as a valve controlled passage for supplying pure oxygen to the central cutting passage of the nozzle. The mixing of the acetylene with oxygen to support combustion in this second form of torch takes place in the nozzle itself. In both forms of torches, a readily controlled valve operated by a lever or trigger is supplied to instantly control, from the handle or medial portion of the torch, the pure oxygen cutting stream and in most instances, provision is made for the latching of this last mentioned valve in fully opened position.

My improved cutting nozzle and the novel combination of cooperating elements thereof, are equally applicable to oxyacetylene torches of both types as will be more apparent from the description which follows.

The foregoing and other objects will be more apparent from the following description made in connection with the accompanying drawings, wherein like reference characters refer to the same parts throughout the several views and in which.

Referring now to the form of the invention illustrated in Figs. 1 to 5 inclusive, my improved nozzle here is of a structure to receive from the torch, a premixture of oxygen and acetylene for the preheating stream, and a pressure stream of pure oxygen for the cutting flame.

Figure 1:
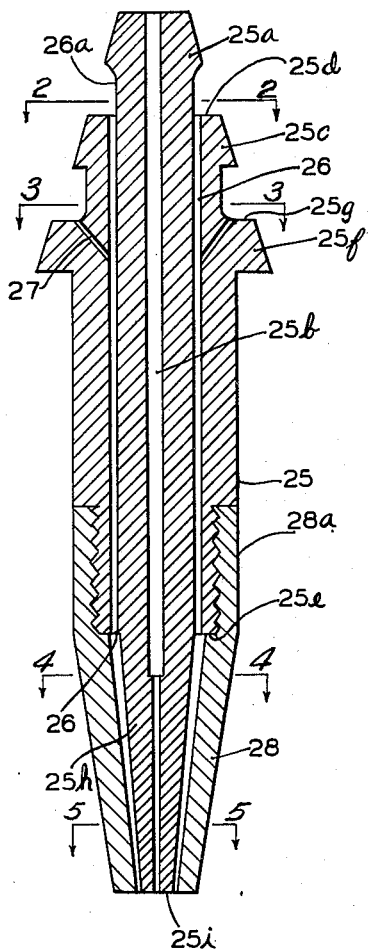
Fig. 1 is a view in enlarged scale of a somewhat different embodiment of my invention constructed for use with a torch of the type which does not premix oxygen with acetylene for the preheating flame, this view showing part of the structure in side elevation and part in axial section.
Figure 2:
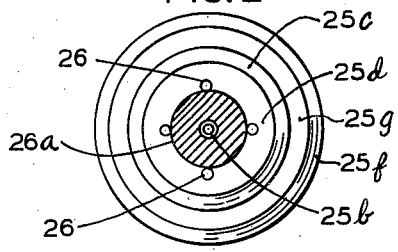
Fig. 2 is a cross section taken on the line 2—2 of Fig. 1.

The torch illustrated in Fig. 1 is of a conventional type comprising an upper tube 10 controlled at its rear end by a responsive valve 11 which is actuated by a latch lever 12 to control supply of pure oxygen for the cutting stream. The torch includes a nipple 13 which is adapted to be connected by flexible hose with a source of oxygen supply. The oxygen conduit 10 connects at its forward end with a downwardly directed coupling or fitting 14 which has an oxygen intake passage 14a in the upper portion thereof for central communication with the axial cutting stream passage of a nozzle. Acetylene gas is supplied to the rear of the torch through a nipple 16 and passes, under suitable pressure control, through an inner tube disposed concentrically within the lower tube 17 of the torch. It is mixed with the requisite amount of oxygen diverted from the main oxygen supply by inductor action at a point 18 in the forward portion of the torch and thereafter, the mixed acetylene and oxygen for the preheating flames passes forwardly through a diverging, longitudinal passage 19a of a tube 19 which communicates at its forward end with coupling 14 and more specifically, with an annular passage 14b disposed a short distance below the oxygen supply passage 14a adapted to communicate with the intake orifices or a nozzle for supplying the preheating mixture. My nozzle, as shown in Figs. 1 to 5 inclusive, comprises a generally cylindrical body 20, constructed of suitable metal such as copper or bronze and having a reduced upper end 20a having an external frusto conical seating surface for gastight connection with a tapered seat communicating with the oxygen passage 14a of the torch. The body 20 is axially drilled from end to end, to provide a cutting stream passage 20b.

Adjacent the diminished upper end 20a, a shoulder 20c common to most cutting nozzles, is provided, having drilled therethrough, and through the body, a plurality of circumferentially arranged acetylene passages 20d which extend throughout their length from top to bottom radially inward to some extent, terminating at the lower extremity 20e of the body 20. Thus, acetylene gas may pass through the several passages from shoulder 20c to the end of the reduced lower portion of the body, which as shown, is externally threaded for engagement with the nozzle tip 21.

The hollow nozzle tip 21 has a cylindrical upper portion 21a internally threaded to engage the lower end of the body and its outer or lower portion is internally formed to define a truncated conical chamber 21b, tapering gradually from its upper to its outer end. The tip extremity is substantially flat and purposely not of concave shape. The external peripheral wall of the nozzle may be shaped in conformity with the chamber 21b therein and preferably, is provided with a nut portion at its upper end to facilitate application of a wrench for tightening the tip upon the body.

Figure 3:
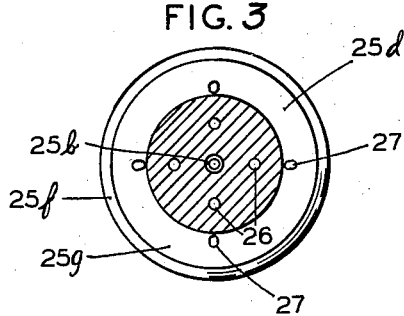
Fig. 3 is a cross section taken on the line 3—3 of Fig. 1.
Figure 4:
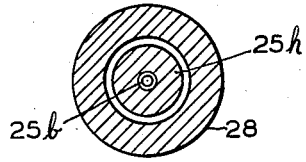
Fig. 4 is a cross section taken on the line 4—4 of Fig. 1.
Figure 5:
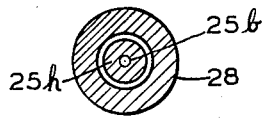
Fig. 5 is a cross section taken on the line 5—5 of Fig. 1.

A slender extension member 22 fits within the tubular nozzle member 21 and has at its upper end, an enlargement forming a collar 22a, the bottom edge of which is adapted to be seated against an annular shoulder 21c provided by the nozzle casing. The enlargement 22a is adapted to precisely seat flush against the lower reduced end 20e of the body 20 and is annularly grooved in the upper portion to form a chamber wherein the acetylene and oxygen mixture is discharged from the orifices of the circumferentially arranged passages 20d. Two or more ports or apertures 22c are formed through the bottom of the enlargement 22a in communication with the annular channel therein to discharge the mixed acetylene and oxygen into the annular, elongated passage defined between the truncated-conical inner wall 21b of the nozzle casing and the external, truncated conical surface of extension member 22. The intermediate portion of extension member 22 may be provided with an integrally formed centering or spacing element 22d which is, as shown in Figs. 3 and 6, recessed to offer no substantial restriction to the downward flow of the acetylene mixture in the annular passage between tip casing 21 and extension member 22 but which in cooperation with the shoulder 21c very accurately spaces the extension member relative to the interior of the nozzle tip or sleeve 21.

The annular passage defined between the interior of nozzle tip 21 and extension member 22 diminishes in cross sectional area constantly from its upper to its outer end or nozzle extremity. This is provided for by tapering the external surface of the extension member 22 less sharply than the frustoconical inner peripheral surface 21b of the nozzle casing. Extension member 22 terminates at its outer end substantially flush with the extremity of the nozzle casing, thereby providing an annular discharge orifice spaced from and surrounding the discharge orifice 22d of the oxygen cutting stream.

The extension member 22 is axially bored from end to end at 22b to provide a continuation of the cutting stream passage 20b of the body and when the device is assembled, the upper surface of the enlargement 22a seated flush against the lower end of the body member seals the parts and effects registration of the axial passages 20b and 22b. The axial passage 22b at its upper extremity, as shown, is of substantially the diameter of the axial cutting stream passage 20b through the body but tapered adjacent its upper end to a lower restricted, untapered passage for the greater part of the length of the extension member, this untapered discharge portion being essential to get the proper velocity and discharge of the cutting stream in substantially straight line form.

My nozzle is secured to the nipple 14 of the blow torch in conventional manner, by an externally threaded sleeve 23, the inner end of which abuts against an annular shoulder 20f provided in the upper portion of the body member. Member 23 has an enlarged head or nut portion 23a by which it may be turned to threadedly engage an internal thread in the lower receiving end of the coupling 14 of the torch.

My improved cutting nozzle disclosed herein is adapted for use in connection with various conventional types of cutting torches which make provision for controlled supply of oxygen and also a suitable supply of a hydrocarbon gas such as acetylene.

In the drawings an embodiment of my cutting nozzle is shown, adapted for attachment to cutting torches wherein the mixture of the acetylene with the requisite amount of combustion supporting oxygen is effected outside of the torch proper and in nozzle structure. In this form, a body 25 of generally cylindrical contour is provided, having a reduced upper extremity 25a provided with an external, beveled surface for seating in a suitable fitting or coupling at the delivery end of the torch proper and constituting the oxygen receiving medium for the cutting stream of the nozzle. The body 25 is axially bored from end to end defining the said cutting stream passage 25b which is of materially increased diameter as contrasted with the other gas passages to be described.

Just below the diminished portion 25a of the body, a somewhat diminished portion 25c is provided defining at its upper edge an annular shoulder 25d through which a series of longitudinally extending small oxygen passages 26 are drilled or otherwise formed. Passages 26 extend longitudinally from shoulder 25d to the shoulder 25e provided at the lower, cylindrical and externally threaded portion of the body, and serve to communicate the source of supplemental oxygen for admixture with the acetylene in the preheating stream.

Below the portion 25c of the body, I provide a third collar 25f of larger diameter which defines an annular shoulder 25g and through this collar and a portion of the body, a series of radially converging acetylene ports 27 are drilled equal in number with the longitudinal oxygen passages 26 and communicating respectively therewith. The mixture of oxygen and acetylene thus takes place initially in the medial portions of the passages 26 below the points of communication with the acetylene supply passages 27. The collar 25f like the collars previously described has an external frustoconical seating surface for seating with a complementarily formed seat in the acetylene supply chamber provided by the discharge coupling of the torch.

The body 25 at its central longitudinal portion is extended beyond the shoulder 25e forming an integral, depending, tapered extension member 25h. Extension member 25h has, preferably, a smooth, frusto-conical external surface tapering gradually and uniformly from top to bottom and terminates in an annular extremity 25i which preferably is flatted to lie substantially in the plane of the tip casing or sleeve 28. The axial cutting stream bore 25b continues axially through the plug member 25h but it is to be noted (see Fig. 1) that the lower end of the cutting stream bore is diminished relatively to the upper portion and this diminished end of the bore is of uniform diameter from the tip extremity to a point near the upper end of the plug member 25h.

I provide a tubular truncated conical nozzle sleeve 28 for symmetrically surrounding in spaced relation, the tapered plug member or extension 25h, said sleeve, being internally threaded at its upper portion to engage the threaded, depending portion of the body just above the plug member 25h and having at its upper portion, flatted external surfaces 28a disposed diametrically opposite to enable the sleeve to be tightened with a wrench. The lower internal portion of nozzle sleeve 28 is bored to constitute a smooth, internal truncated conical surface of greater diameter throughout than the external surface of plug member 25h but tapering more sharply from its upper to its lower end. Thus, the external surface of plug member 25h and the internal conical surface of nozzle sleeve 28 together, define an annular preheating stream discharge for the acetylene mixture which successively decreases in cross sectional area from inner to outer ends, thereby increasing the velocity of the cylindrical jet of gas discharged. The upper end of said annular passage is of course, in communication with the ends of the longitudinal acetylene mixture passages 26.

*Operation*

With my invention it will be noted that the gaseous mixture for the preheating stream is delivered under pressure through a comparatively unrestricted annular passage which is converged somewhat from its inner to its discharge end and which, in annular fashion, is disposed coaxial of the central longitudinal passage for delivering the oxygen cutting stream.

Thus, during preheating of the metal before the oxygen cutting stream valve is opened, a cylindrical jet of acetylene mixture is discharged which enables the heat to be applied more directly to the intended line of cut as contrasted with other nozzles which use from four to six orifices for the preheat flame, causing the heat to be spread in four to six directions and to particularly, spread in such directions when the oxygen stream is introduced.

With my improved structure, an efficient mix of the acetylene gas with its combustion-supporting oxygen is obtained upon delivery of the mixture into the elongated annular passage in the tip portion of the nozzle. Thus, a more complete combustion is brought about through such additional mixture of the acetylene with supplemental oxygen.

Because the elongated, annular passage for the preheating gas is comparatively unrestricted and a more thorough mixing is obtained, there is less heating of the nozzle or tip in my construction than in nozzles utilizing a series of circumferentially arranged preheating orifices.

The production of an annular or cylindrical preheating flame with my device, eliminates backfire or choking which is a great objection to most cutting nozzles now in extensive use. With the multi, preheating orifice type of nozzle, a drop of moisture or impurity often causes a clogging of one of the small preheating passages producing choking and subsequent backfire which is very objectionable and costly in the cutting of metal. When such backfire occurs after the cutting has been started, the operator loses the line of cut and then must return to the previous groove and wait several seconds for sufficient preheating before starting the cut again. In such instances, even an expert operator cannot restart the cut without blowing a hole in the parent metal and producing a job which may be inadequate and certainly will have a bad appearance.

With my improved structure, the nozzle will not backfire even when cutting on rusty iron. The prevention of backfiring not only greatly improves the efficiency and uniformity of the cut, but materially reduces the flying of sparks and molten metal which means less danger to the eyes and clothing of the operator. With the preheating flame discharged in annular or cylindrical formation rather than in a form of circumferentially arranged, independent jets the heat is confined more closely to the area of the cut and therefore, considerably less stress is set up in the parent metal. Consequently, with my improved cutting nozzle, a material reduction in warping of the metal is present.

I have found that in testing my cutting nozzles, comparatively, with the multi orifice, preheating jet type, that my efficiency of combustion for similar cutting operations is such that a saving in excess of thirty per cent of acetylene gas is realized with my structure with, as has been pointed out, cleaner and more accurate cutting.

With my invention, mixing of the acetylene and supporting oxygen takes place entirely within the nozzle, first in the passages 26 after entrance, then in the discharge of said mixture from the outer ends of passages 26 into the inner end of the tapered annular passage in the tip. The travel of the acetylene and supporting oxygen in the annular passage of the tip for supplying the preheating flame is very effective to produce excellent combustion at the discharge.

It will be noted that with my invention, the extremities of the inner plug members and the associated tip casings or sleeves are in flush relationship to a plane disposed normal to the axes. This, I have found quite essential to produce a jet of preheating gas which will properly discharge and ignite in the form of a continuous circular or cylindrical flame. With the structure disclosed, the preheating flame concentrically surrounds the oxygen cutting stream and the heat if confined very closely to the area of the cut may be directed precisely to the line and will not be spread out in a multiplicity of directions when the oxygen stream for cutting is introduced.

It will of course, be understood that various changes may be made in the form, details, arrangement and proportions of the parts without departing from the scope of my invention.

What I claim is:

1. A nozzle for a cutting torch comprising, a symmetrical, elongated body having a straight central, longitudinal bore therethrough for supplying an oxygen cutting stream under pressure and having a secondary straight longitudinal passage therethrough for supplying a preheating gaseous mixture, said body having an externally threaded portion adjacent its outer end terminating in an annular shoulder through which said secondary longitudinal passage extends, an extension member integrally formed with said body and extending axially from the outer end thereof and having an axial oxygen passage therethrough in communication with said central longitudinal bore, said extension member having an outwardly tapered frusto conical exterior surface, and an encasing element constituting a sleeve internally threaded at its inner end for attachment to said threaded portion of said body and having an internal frusto conical surface surrounding said extension member and spaced therefrom to define therewith an annular passage communicating at its inner end with said secondary, longitudinal passage, said extension member and said sleeve terminating in substantially a common plane disposed normally to said axial passage.

2. The structure set forth in claim 1 wherein said extension member is integrally formed with said body.

3. A nozzle for a cutting torch comprising a straight symmetrical body having a substantially axial, longitudinal bore therethrough for supplying an oxygen cutting stream under pressure and having a plurality of straight, longitudinal secondary bores arranged circumferentially of said axial oxygen supply bore for supplying a preheating gaseous mixture, said body having a reduced extension disposed axially of said oxygen supply bore and having an axial passage in communication with said first mentioned oxygen supply bore, said axial passage having the greater and outermost portion thereof of uniform diameter and of less diameter than said oxygen supply bore, said extension having a generally smooth, frusto-conical exterior surface disposed concentrically of said oxygen passage and tapering from inner to outer end, the reduced extension portion of said body leaving a terminal, annular shoulder in said body, said circumferentially arranged secondary bores extending through said shoulder and a tubular encasing element surrounding the outer portion of said body and secured thereto and also surrounding said extension and being disposed coaxially thereof, said encasing element having an internal frusto-conical surface disposed coaxially of said extension and forming with said extension a narrow, comparatively unrestricted annular passage communicating at its inner end with said secondary spaced bores, said last mentioned internal frusto-conical surface being tapered outwardly in such relation to the taper of said extension as to produce in said annular passage convergence from the inner to the outer extremity thereof.

4. A nozzle for a cutting torch comprising as essential elements only two parts, one of said parts comprising a straight symmetrical body having a substantially axial, longitudinal oxygen-supplying bore therethrough and having an annular connection shoulder adjacent its inner end and a plurality of longitudinal secondary bores arranged generally circumferentially of said oxygen supply bore and having communication at their inner ends through said annular shoulder, said secondary bores being adapted to supply at their outer ends a pre-heating gaseous mixture, said body having an integral reduced extension at its outer end extending axially thereof and having an axial passage communicating with said oxygen supply bore, said axial passage having the outermost portion thereof for some distance of uniform diameter and of a less diameter than said oxygen supply bore, said extension having a generally smooth, frusto-conical exterior surface disposed concentrically of said oxygen passage and tapering outwardly, the reduced extension of said body leaving a terminal, annular shoulder inwardly of the extremity of said extension, said circumferentially arranged secondary bores extending through said shoulder, and the second part of said nozzle comprising a tubular encasing element surrounding and having threaded engagement with the outer portion of said body inwardly of said terminal shoulder, said encasing element being disposed coaxially of said extension and having an internal frusto-conical surface also disposed coaxially of said extension and forming therewith a narrow, comparatively unrestricted annular passage communicating at its inner end with the outer ends of said secondary spaced bores, said encasing element and said extension terminating substantially in a common plane.

ROY PACH.

REFERENCES CITED

The following references are of record in the file of this patent:

UNITED STATES PATENTS

| Number | Name | Date |
| --- | --- | --- |
| 1,318,616 | Smith | Oct. 14, 1919 |
| 1,471,456 | Errett | Oct. 23, 1923 |
| 1,483,467 | Meden | Feb. 12, 1924 |
| 1,808,968 | Plumley | June 9, 1931 |
| 1,879,789 | Browning | Sept. 27, 1932 |
| 2,151,443 | Ruch | Mar. 21, 1939 |
| 2,367,316 | Skinner | Jan. 16, 1945 |